United States Patent
Liang

(12) United States Patent (10) Patent No.: US 7,921,654 B1
Liang (45) Date of Patent: Apr. 12, 2011

(54) COOLED TURBINE STATOR VANE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 886 days.

(21) Appl. No.: 11/900,034

(22) Filed: Sep. 7, 2007

(51) Int. Cl.
*F02C 7/12* (2006.01)
(52) U.S. Cl. .................. 60/806; 415/115; 416/97 R
(58) Field of Classification Search .............. 60/806; 415/115, 116; 416/92, 95, 96 A, 96 R, 97 A, 416/97 R
See application file for complete search history.

(56) References Cited

U.S. PATENT DOCUMENTS

| | | | | |
|---|---|---|---|---|
| 3,628,880 | A * | 12/1971 | Smuland et al. | 415/175 |
| 4,153,386 | A * | 5/1979 | Leogrande et al. | 415/115 |
| 4,252,501 | A * | 2/1981 | Peill | 415/115 |
| 4,297,077 | A | 10/1981 | Durgin et al. | |
| 4,616,976 | A | 10/1986 | Lings et al. | |
| 5,392,515 | A * | 2/1995 | Auxier et al. | 29/889.721 |
| 5,405,242 | A | 4/1995 | Auxier et al. | |
| 5,511,937 | A | 4/1996 | Papageorgiou | |
| 5,591,002 | A * | 1/1997 | Cunha et al. | 415/115 |
| 5,609,466 | A | 3/1997 | North et al. | |
| 5,762,471 | A | 6/1998 | Cunha | |
| 5,829,245 | A | 11/1998 | McQuiggan et al. | |
| 6,019,572 | A | 2/2000 | Cunha | |
| 6,089,822 | A | 7/2000 | Fukuno | |
| 6,200,087 | B1 | 3/2001 | Tung et al. | |
| 6,270,317 | B1 | 8/2001 | Manning et al. | |
| 6,345,955 | B1 | 2/2002 | Heffron et al. | |
| 6,761,529 | B2 | 7/2004 | Soechting et al. | |
| 7,004,720 | B2 | 2/2006 | Synnott et al. | |
| 7,008,185 | B2 * | 3/2006 | Peterman et al. | 416/96 A |
| 7,090,461 | B2 | 8/2006 | Liang | |
| 7,097,418 | B2 | 8/2006 | Trindade et al. | |
| 7,179,047 | B2 | 2/2007 | Cooper | |
| 7,204,675 | B2 | 4/2007 | Texier | |
| 2002/0090294 | A1 * | 7/2002 | Keith et al. | 415/115 |
| 2004/0265129 | A1 * | 12/2004 | Pabion et al. | 416/97 R |

* cited by examiner

*Primary Examiner* — Michael Cuff
*Assistant Examiner* — Phutthiwat Wongwian
(74) *Attorney, Agent, or Firm* — John Ryznic

(57) ABSTRACT

A first stage turbine stator vane used in an industrial gas turbine engine, the vane having an outer endwall and an inner endwall with the airfoil extending between the two endwalls. A showerhead arrangement of film cooling holes is located along the leading edge region, and a row of exit cooling air slots is located along the trailing edge of the airfoil. A slanted rib extends from the outer endwall to the inner endwall and separates the vane into a forward cavity and an aft cavity. A leading edge impingement tube is secured within the forward cavity to provide impingement cooling to the leading edge walls of the airfoil. The leading edge impingement tube includes a cooling air inlet section extending out from the inner endwall so that a vena contractor forms in the tube entrance before the impingement holes begin. The leading edge impingement tube narrows in the cooling air flow direction. The trailing edge impingement tube has similar construction but has the cooling air inlet extending out from the outer endwall. With this design, the first stage vane can use both impingement cooling of the leading edge region and showerhead film cooling of the leading edge airfoil surface to allow for a higher gas flow temperature across the vane.

17 Claims, 3 Drawing Sheets

View A-A

View B-B

COOLED TURBINE STATOR VANE

BACKGROUND OF THE INVENTION

1. Field of the Invention

The present invention relates generally to a gas turbine engine, and more specifically to an air cooled stator vane with impingement and film cooling.

2. Description of the Related Art Including Information Disclosed Under 37 CFR 1.97 and 1.98

In a gas turbine engine, air is pressurized in a compressor and mixed with fuel and ignited in a combustor for generating hot combustion gases. The gases are discharged through a first stage high pressure turbine nozzle having stator vanes which direct the gases toward a row of turbine rotor blades extending radially outwardly from a supporting disk.

The turbine blades extract energy from the combustion gases and power the compressor. The gases are then channeled to a low pressure turbine typically having several stages of nozzle vanes and rotor blades which extract additional energy from the gases for producing output work such as powering a fan in a turbofan aircraft engine embodiment.

Since the high pressure turbine nozzle firstly receives the combustion gases from the combustor, it must be cooled for enjoying a suitable useful life. A typical turbine nozzle includes a row of airfoil vanes circumferentially spaced apart from each other and extending radially in span between outer and inner annular bands. The vanes are hollow for receiving therein a portion of compressor discharge air used for cooling the individual vanes. Especially in an industrial gas turbine engine, the first stage of stator vanes are exposed to the combustor outlet hot gas flow directly and therefore must be cooling the most of any of the turbine airfoils. The compressed air used to cool the first stage stator vanes is from the outlet of the compressor since the outlet air pressure is the highest pressure available from the compressor. The hot gas flow from the combustor has a pressure slightly less than the compressor outlet pressure due to losses from passing through the combustor. In order to prevent the hot gas flow ingestion into the film cooling holes of the stator vane, the cooling air pressure must be higher than the gas pressure. Because the high cooling amount required for the first stage stator vanes, the vane must be cooled with both impingement cooling and film cooling to withstand the high gas temperature. It is therefore a major design problem to be able to provide both impingement cooling and film cooling to the first stage stator vane with enough cooling air pressure so that the hot gas does not flow into the cooling holes.

In order to protect the external surface of the vanes from the hot combustion gases flowing thereover, various radial rows of film cooling holes are provided through the pressure and suction sides of the vane. Since the leading edge of the vane first receives the hot combustion gases, it typically includes several rows of film cooling holes in a showerhead configuration. The air discharged from the film cooling holes produces a boundary layer of cooling air along the external surface of the vane which is re-energized with additional cooling air from row-to-row. The film cooling air provides a barrier protecting the metal of the vane from the hot combustion gases during operation.

Since the combustion gases flow with different velocities over the pressure and suction sidewalls of the vane, the various regions of the vane from leading to trailing edge are subject to different amounts of heating therefrom, and correspondingly require different amounts of cooling. Since any air diverted from the combustor for cooling the nozzle vanes decreases overall engine efficiency, the amount thereof should be minimized while obtaining a suitable useful life for the nozzle vanes.

The varying heating effect of the combustion gases and the varying cooling effect of the cooling air further complicate vane design since temperature gradients are created. Temperature gradients cause differential expansion and contraction of the vane material, which in turn causes thermally induced strain and stress which affects the low cycle fatigue life of the vane during operation.

Several methods exist to improve the gas turbine engine power output and cycle efficiency. Lower the combustor pressure loss will yield higher turbine inlet pressure which results in a higher overall working pressure ratio across the gas turbine engine and a higher engine power output. A typical pressure loss differential through the combustor is 2.5 to 4.5% of the combustor pressure. Another method is to increase the turbine inlet temperature. Another is to reduce the total cooling and leakage flow demand. Less flow bleed off from the compressor for the turbine cooling results in more flow through the combustor to provide working fluid to the turbine. Another method is to minimize the cooling air pressure loss to the vane.

In the method of low cooling air supply pressure for the first stage vane cooling design, due to high loss of cooling air to the vane, the turbine inlet pressure is at a much higher level than the cooling supply pressure which limits utilizing effective film cooling in the cooling design for the vane. The first stage vane is then cooled by means of backside impingement cooling without an external showerhead film cooling. However, there is a limit of cooling effectiveness level that can be achieved for an all convectively cooled airfoil which translates to a maximum permissible operating temperature for the first stage vane material capability. On the other hand, in the case of low combustor pressure drop for the first stage vane cooling design, there is not sufficient cooling pressure to utilize both backside impingement cooling in combination with a showerhead cooling for the vane leading edge region. As a result of this design constraint, the turbine firing temperature and the potential growth for the engine is limited.

U.S. Pat. No. 6,200,087 B1 issued to Tung et al on Mar. 13, 2001 and entitled PRESSURE COMPENSATED TURBINE NOZZLE discloses a turbine vane with an embodiment in FIG. 4 of this Tung patent in which a leading edge cone shaped cavity is separated from a mid chord cavity by a slanted rib such that the two cavities are cone shaped in the cross section. Each cavity includes an impingement tube. Major differences between the Tung patent and the present invention is that the impingement tubes in the Tung patent do not extend out from the cavity far enough to solve the problem with the vena contractor, and the mid chord cavity is not directly connected to the outlet holes along the trailing edge. In the Tung patent, cooling air from the mid chord cavity flows through the impingement holes in the tube, then through the holes in the rib and through pin fins, and then through the outlet holes. Because of the extra row of holes in the rib, a higher pressure is required to prevent injection of hot gas into the outlet holes.

It is an object of the present invention to provide for a first stage turbine stator vane with both backside impingement cooling in combination with a showerhead cooling for the leading edge region of the vane.

It is another object of the present invention to provide for a gas turbine engine with a higher permissible operating temperature for the first stage stator vane.

It is another object of the present invention to provide for a process for operating an industrial gas turbine engine in which the overall back flow margin is within a minimum amount in order to allow for the first stage vanes to be cooled both by impingement and film cooling.

It is another object of the present invention to produce a first stage turbine stator vane with both impingement and film cooling in which the pressure drop across the impingement cooling holes is no more than 30% of the total pressure drop across the impingement and the film cooling holes of the leading edge.

BRIEF SUMMARY OF THE INVENTION

A first stage turbine stator vane used in an industrial gas turbine engine, the vane having an outer endwall and an inner endwall with the airfoil extending between the two endwalls. A showerhead arrangement of film cooling holes is located along the leading edge region, and a row of exit cooling air slots is located along the trailing edge of the airfoil. A slanted rib extends from the outer endwall to the inner endwall and separates the vane into a forward cavity and an aft cavity. A leading edge impingement tube is secured within the forward cavity to provide impingement cooling to the leading edge walls of the airfoil. The leading edge impingement tube includes a cooling air inlet section extending out from the inner endwall so that a vena contractor forms in the tube entrance before the impingement holes begin. The leading edge impingement tube narrows in the cooling air flow direction. The trailing edge impingement tube has similar construction but has the cooling air inlet extending out from the outer endwall. With this design, the first stage vane can use both impingement cooling of the leading edge region and showerhead film cooling of the leading edge airfoil surface to allow for a higher gas flow temperature across the vane.

The first stage stator vanes include film cooling holes for the leading edge of the airfoil (showerhead arrangement) and an impingement tube with impingement cooling holes for the inner surface of the leading edge of the airfoil. The size of the impingement holes and the showerhead holes are of such size that the pressure loss across the impingement holes is no more than 30% of the total pressure loss across the impingement holes and the film holes on the leading edge of the airfoil. Above this percentage and the impingement holes could become closed from impurities in the cooling air and not provide adequate impingement cooling to the inner wall of the leading edge. Also, when a number of impingement cooling holes become closed, the pressure drop across the impingement holes becomes so great that the available pressure for the showerhead holes is not enough to prevent back flow into the airfoil from the hot gas flow or not enough film cooling discharge to adequately cool the leading edge. In either case, the stator vane will not be cooled and the life span shortened significantly.

In the gas turbine engine, the overall back flow margin (overall BFM, ratio of the difference between the cooling air pressure and the gas flow pressure divided by the gas flow pressure) is designed to be as low as one for the leading edge of the first stage vanes and as little as two for the trailing edge of the first stage stator vanes in order to maximize the engine efficiency and provide adequate long time cooling for the vane leading and trailing edges. BFM is the measure across a single cooling hole while the overall BFM is the measure across the series of cooling holes which in this case is the impingement hole on the tube followed by the film hole on the leading edge.

With this first stage turbine vane cooling design, the issue associated with low cooling air supply pressure and/or low combustor pressure loss problem and high cooling bleed off at the compressor exit can be addressed as discussed above with the prior art.

DETAILED DESCRIPTION OF THE INVENTION

Figure 1:
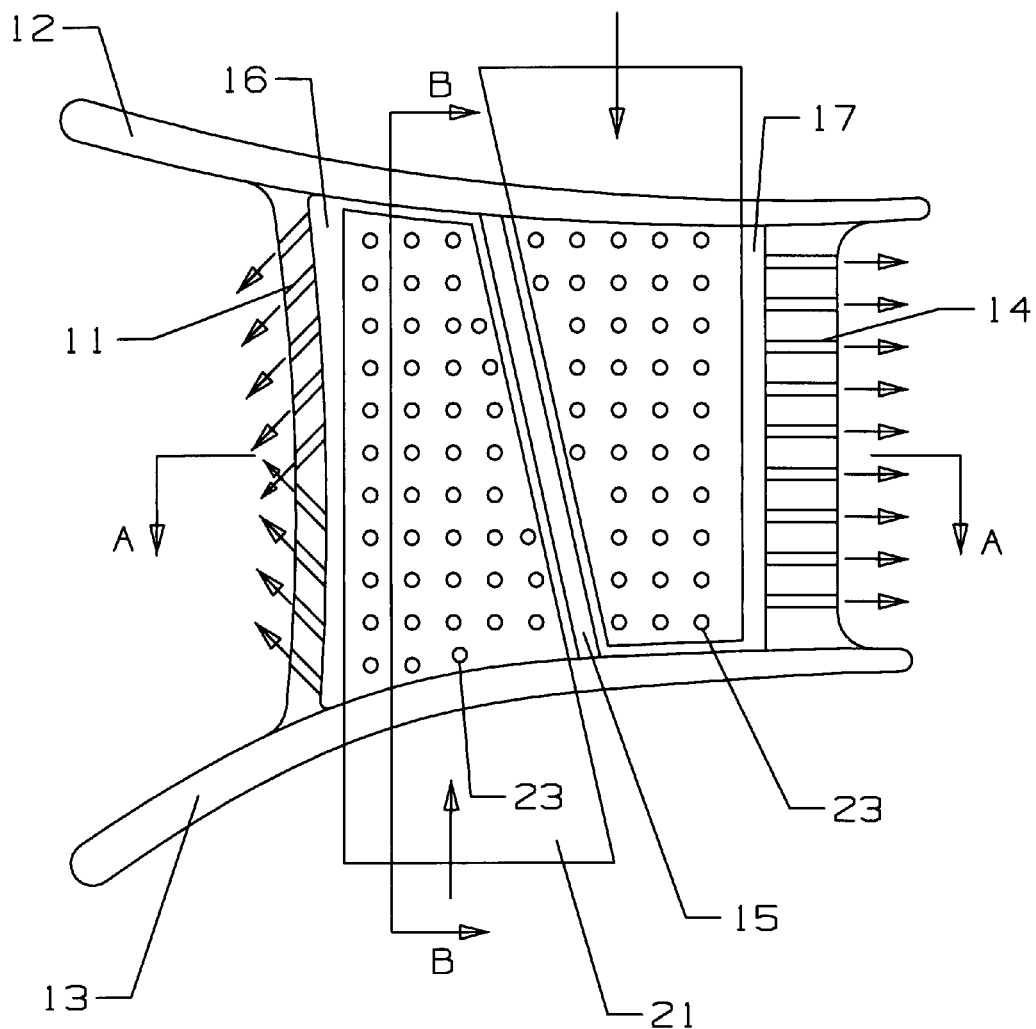
FIG. 1 shows a side view of a cross section of a first stage turbine stator vane of the present invention.

The turbine stator vane of the present invention is intended for use as the first stage vane in an industrial gas turbine engine. However, the concepts of the present invention could be useful for other stages of vanes or for vanes in other types of gas turbine engines such as those that power an aircraft. FIG. 1 shows a side view through a cross section of the stator vane. The vane includes a leading edge showerhead 11 with film cooling holes on the upper half of the leading edge directing cooling air toward the lower half of the leading edge, and film cooling holes on the lower half directing cooling air toward the upper half of the leading edge. An inner diameter endwall 12 and an outer diameter endwall 13 define a hot gas flow path through the airfoil portion of the vane. A trailing edge includes a row of exit cooling air slots 14 to discharge cooling air out through the trailing edge region of the vane. A slanted rib 15 extends from a forward position on the outer diameter endwall to a rearward position on the inner diameter endwall 13 and separates a leading edge impingement cavity 16 from a trailing edge impingement cavity 17 formed within the vane. Both the leading and trailing edge cavities are without trip strips along the inner walls so that a loss in cooling air pressure does not occur.

A main feature of the present invention is the separation of the leading edge cavity 16 from the trailing edge cavity 17 in order to allow for different pressures of the cooling air supply to each. In other embodiment, one or more mid chord cavities can be included between the leading and trailing edge cavities. Another main feature of the present invention is the direct connection of the cooling air path from the trailing edge cavity 17 to the cooling air exit slots 14 in order to allow for a lower supply pressure for the trailing edge cavity with enough pressure at the exit slots 14 to prevent backflow.

Secured within the leading edge impingement cavity 16 is a leading edge impingement tube 21 with a portion sticking out from the inner endwall 13 to form an entrance length. Secured within the trailing edge impingement cavity 17 is a trailing edge impingement tube 22 with a portion sticking out from the outer endwall 12 to form an entrance length. Each of the two impingement tubes 21 and 22 includes a number of impingement holes 23 arranged to discharge impingement cooling air to the inner surfaces of the vane. Cooling air enters the leading edge impingement tube 21 from the bottom of the tube 21, and cooling air enters the trailing edge impingement tube 22 from the top of the tube 22 as shown by the arrows in FIG. 1. Cooling air from the leading edge impingement cavity 16 flows through the showerhead film cooling holes 11, and cooling air within the trailing edge cavity flow through the trailing edge exit slots 14. In order to reduce the pressure loss of the cooling air flowing through the forward and aft cavities 16 and 17, no trip strips are used on the walls.

In other embodiments of the present invention, one or more cavities can be positioned between the forward cavity 16 and the aft cavity 17 to provide cooling for the mid chord region of the blade. Another impingement tube would be used for each of these additional mid chord cavities to provide cooling air to impinge within the mid chord cavities.

Figure 2:
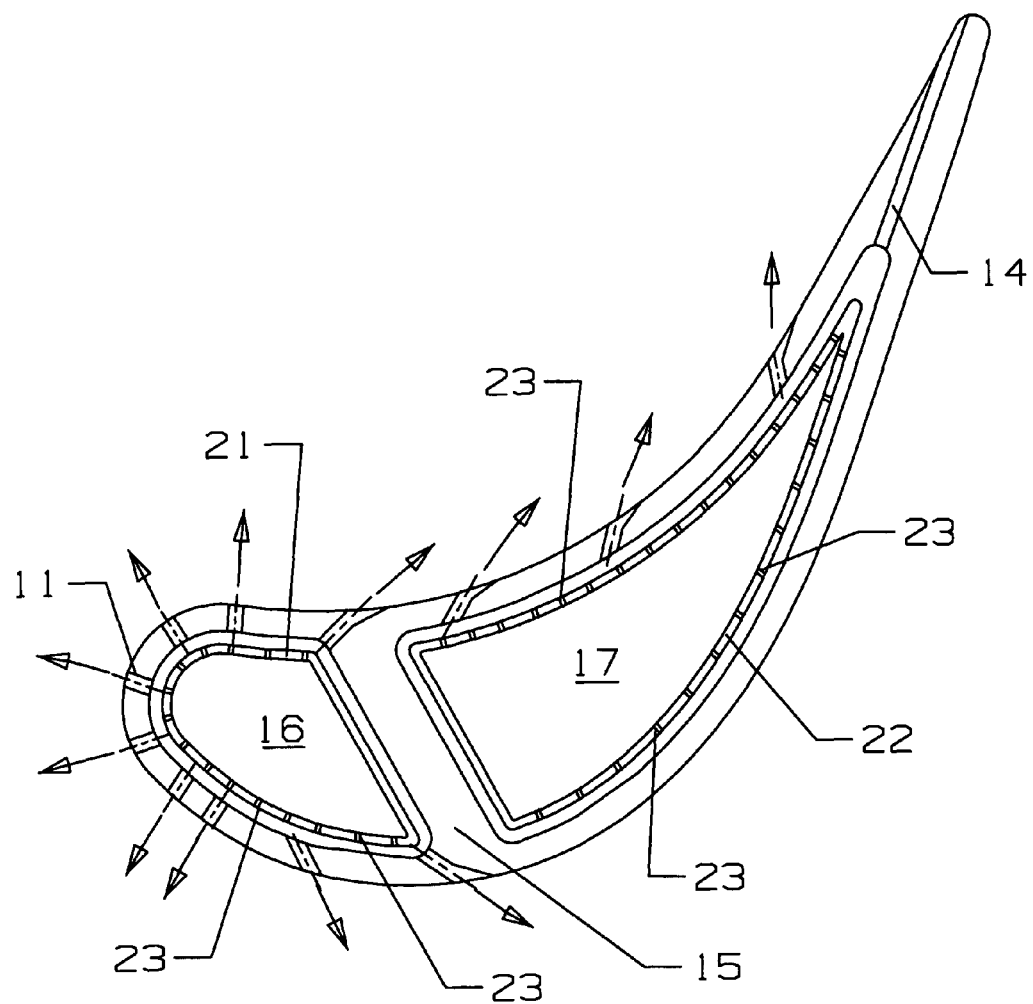
FIG. 2 shows a top view of a cross section of the stator vane of FIG. 1 taken through line A-A.

FIG. 2 shows a top view of a cross section of the stator vane of FIG. 1 taken along the line A-A in FIG. 1. The airfoil shape of the stator vane with a leading edge and a trailing edge and pressure side and suction side walls is clearly shown. The leading edge includes the showerhead film cooling holes 11 with additional suction side and pressure side film cooling holes, and a pressure side and a suction side gill hole downstream from the additional film holes. The leading edge impingement tube 21 is shown secured in place within the leading edge impingement cavity 16. Impingement holes 23 within the leading edge impingement tube 21 are arranged along the tube 21. The slanted rib 15 separates the leading edge impingement cavity 16 from the trailing edge impingement cavity 17 in which the trailing edge impingement tube 22 is secured. Additional film cooling holes are located on the suction side of the airfoil and connect to the trailing edge cavity 17 to discharge film cooling air onto the suction side airfoil surface. Film cooling holes could also be used on the pressure side of the airfoil if necessary. Impingement holes 23 are also placed around the tube 22 to provide impingement cooling to the inside surfaces of the airfoil walls. The exit cooling slot 14 connects the trailing edge cavity 22 to the trailing edge of the vane.

Figure 3:
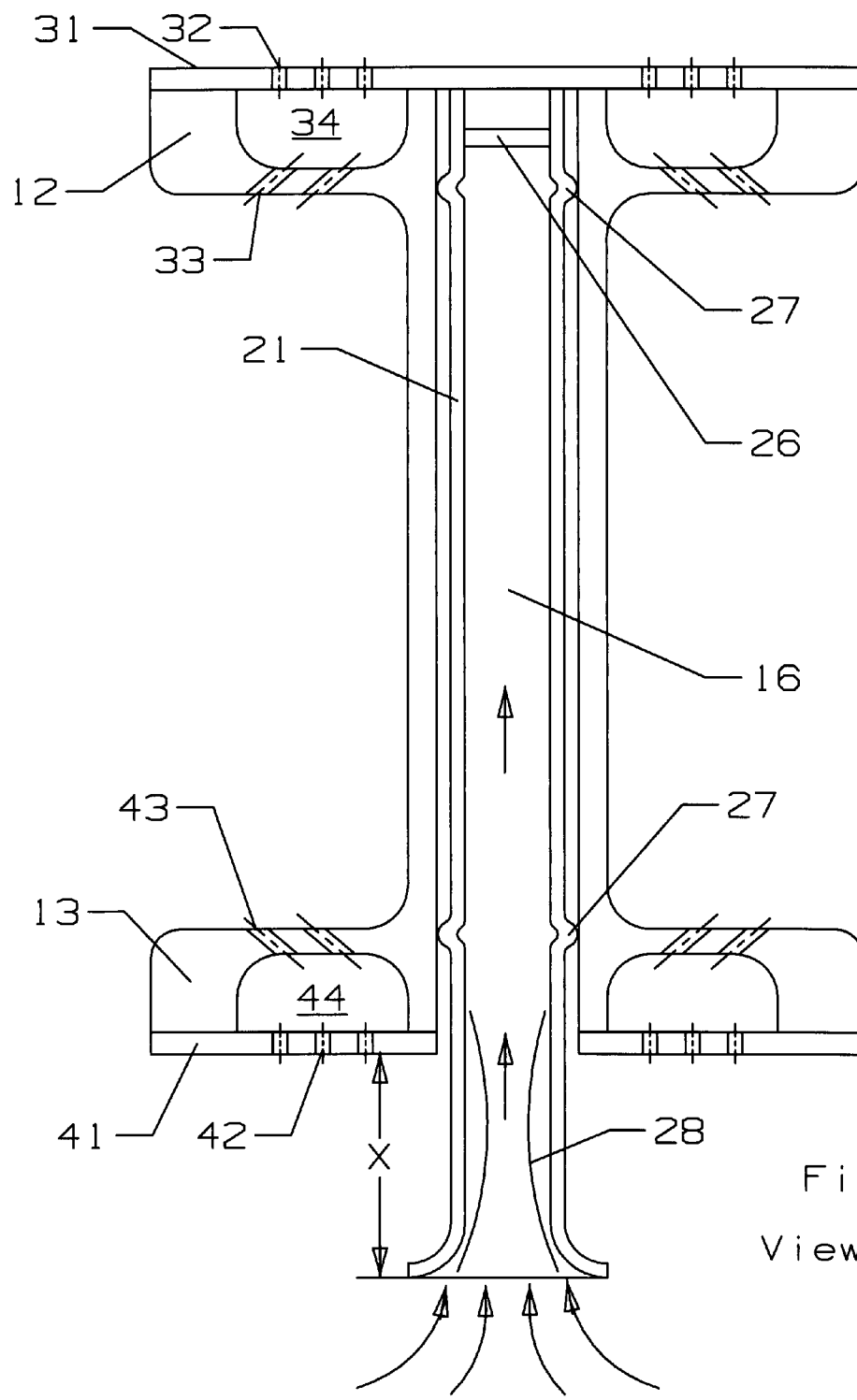
FIG. 3 shows a front view of a cross section of the stator vane of FIG. 1 taken through line B-B.

FIG. 3 shows a side view of a cross section of the stator vane of FIG. 1 taken along the line B-B shown in FIG. 1. The vane airfoil extends between the outer endwall 12 and the inner endwall 13 with the leading edge impingement tube 21 secured within the leading edge impingement cavity 16. An outer diameter impingement plate 31 is placed over the outer diameter endwall and includes impingement holes 32 above an outer endwall impingement cavity 34 to direct impingement cooling air into. Outer endwall film cooling holes 33 discharge the impingement cooling air out from the outer endwall 12 and into the hot gas flow.

FIG. 3 also shows the inner diameter endwall 13 with an inner diameter impingement plate 41 placed over the inner diameter endwall 13 with impingement holes 42 below an inner diameter endwall impingement cavity 44 to direct impingement cooling air into the cavity 44. Inner endwall film cooling holes 43 discharge the impingement cooling air out from the inner endwall 12 and into the hot gas flow.

The leading edge impingement tube 21 includes an end cap 26 near the outer endwall to close off the cooling air passage in the tube, and includes stand-offs 27 on the outer and the inner endwall sides to position the tube within the cavity 16. The stand offs 27 can be press formed into the insert, or they can be ribs added to the insert by welding or bonding. The portion of the tube 21 sticking out from the bottom of the inner diameter endwall 13 is the entrance length of the tube 21 and forms the cooling air entrance to the tube 21. A vena contractor 28 is formed on the inside of the tube 21 in this entrance length. Having the vena contractor 28 formed at this entrance location in the impingement tube 21 insures that the vena contractor will not be formed within the tube where the impingement holes are located and the impingement cooling of the inner surface walls of the vane are required. The distance X needs to be at least seven times the difference between the tube diameter and the minimum diameter of the vena contractor (the narrow point represented by the two arrows 28 in FIG. 3) in order that the vena contractor will dissipate within the impingement tube upstream of the impingement holes that cool the hot inner walls of the airfoil.

The stator vane construction of the present invention includes a number of benefits over the cited prior art. The impingement tube inlet flow area is maximized. A slanted internal rib is used to subdivide the vane airfoil into two separate cavities. The forward cavity provides the cooling for the airfoil leading edge region where the hot gas pressure is high. Cooling supply is normally fed through the impingement tube from the inner diameter cooling air manifold. Also, the impingement holes in the tube and the showerhead film holes are of such size that the pressure drop across the impingement cooling holes is not greater than 30% of the total pressure loss across the impingement and film cooling holes. By limiting the pressure differential across the impingement holes, the chance of the impingement holes being closed (such as from particulates in the cooling air flow such as dirt)—which will result in an over temperature of the leading edge—is minimized. If enough of the impingement holes are blocked, the pressure loss across the impingement holes will increase and not enough pressure will be available for the showerhead holes. Without adequate cooling air pressure for the showerhead holes, not enough cooling film will be produced to cool the leading edge. If the showerhead cooling pressure is too low, the hot gas flow will flow into the vane through the holes and produce even more damage to the vane.

An impingement tube of the present invention has a proper inlet length. This particular entrance length will enable the inlet vena contractor to be fully reattached outside the hot flow path. This will minimize the low impingement cooling air pressure zone within the vena contractor to occur at the impingement tube. The inlet length is calculated based on the average lengths for the sharp inlet and round inlet geometry of the impingement tube. Also, a distance of greater than 7 times the difference for the impingement tube hydraulic diameter and vena contractor hydraulic diameter is preferred.

The impingement tube of the present invention has sufficient overall back flow margin (BFM) for the first stage vane cooling design. The overall back flow margin was defined as the percentage of pressure drop from the coolant side static pressure to the gas path total pressure where the coolant pressure is the internal static pressure at the vane leading edge compartment inlet, including entrance loss for the cooling flow entering the impingement tube. The overall back flow margin (BFM) for a normal vane should be greater then 2% for the forward impingement cavity and 3% for the aft impingement cavity at the forward edge of the trailing edge compartment.

Proper overall BFM ranges should be considered. For the leading edge impingement cavity, the range for the overall BFM as a function of cooling flow flux entering the impingement tube, a good cooling design for the overall BFM range should be greater than 2%, an average design world be in the range of 1% to 2%, and a bad design would be below 1% margin. Likewise the aft impingement cavity should be in the range of greater than 3%, with 2% to 3% and below 2% corresponding to the good, the average and the bad cooling design. These ranges of overall BFM represent the maximum overall BFM available for the capability of a vane impingement tube inlet region design.

The impingement tube of the present invention has impingement tube cooling pressure drop. Pressure drop across the impingement tube should be no greater than 30% of the overall available pressure drop across the entire impingement and film cooling system. This minimizes the cooling design sensitivity due to cooling hole geometry and variation and design conditions uncertainty.

In the gas turbine engine, the compressor discharged pressurized air at a high pressure. Most of the pressurized air is delivered into the combustor to be burned with a fuel and produce a hot gas flow that is passed into the turbine. Some of the compressed air from the compressor outlet is bled off and used to provide for the impingement and film cooling of the first stage stator vanes. Designers can produce low pressure loss across the combustor in order to increase the engine efficiency. However, the combustor pressure loss cannot be too low or the compressed cooling air available for the first stage vanes will not flow through the leading edge film cooling holes (showerhead) to provide the required impingement and film cooling for the vane. Thus, the combustor pressure loss must be large enough that the compressor outlet air can be used for cooling the first stage vanes but small enough to produce the as high an efficiency as possible. Therefore, the first stage stator vanes are designed to have an overall back flow margin (BFM) of at least 1 for average results but at least 2 for good results across the leading edge, and have an overall BFM of at least 2 for average results but at least 3 for good results across the trailing edge of the first stage vane. This is accomplished by producing a desired pressure loss across the combustor so that the combustor outlet pressure (also considered to be the turbine inlet pressure) is low enough to produce an overall BFM across the leading edge and trailing edge within the above ranges. Also, in order to provide long life and adequate cooling for the first stage vanes, the impingement holes and the showerhead holes are sized such that the pressure loss across the impingement holes on the leading edge is no greater than 30% of the total pressure loss across both the impingement and the showerhead cooling holes. With this overall BFM and pressure loss ratio for the vanes, the engine can operate at a high efficiency and provide adequate cooling for the first stage vanes for long life.

I claim the following:

1. A turbine stator vane for use in a gas turbine engine, the vane comprising:
   an inner diameter endwall and an outer diameter endwall;
   an airfoil extending between the inner and the outer diameter endwalls;
   a showerhead arrangement includes film cooling holes in a lower half of a leading edge oriented to direct cooling air upward, and film cooling holes in an upper half of the leading edge oriented to direct cooling air downward;
   a row of exit cooling slots on the trailing edge region of the airfoil;
   a slanted rib slants toward the trailing edge from the outer endwall to the inner endwall, the slanted rib extending between the outer diameter endwall and the inner diameter endwall and separating a leading edge cavity within the airfoil from a trailing edge cavity;
   a leading edge impingement tube secured within the leading edge cavity;
   a trailing edge impingement tube secured within the trailing edge cavity;
   the row of exit cooling slots being connected directly to the trailing edge cavity; and,
   cooling air supply means to supply compressed cooling air to the leading edge cavity and the trailing edge cavity.

2. The turbine stator vane of claim 1, and further comprising:
   the leading edge impingement tube includes an opening on the inner diameter endwall side of the airfoil, and the tube narrows in the direction of cooling air flow within the tube.

3. The turbine stator vane of claim 2, and further comprising:
   the trailing edge impingement tube includes an opening that extends out from the inner diameter endwall to form an entrance space in which a vena contractor can form and end before the impingement holes in the tube.

4. The turbine stator vane of claim 1, and further comprising:
   the trailing edge impingement tube includes an opening on the outer diameter endwall side of the airfoil, and the tube narrows in the direction of cooling air flow within the tube.

5. The turbine stator vane of claim 1, and further comprising:
   the leading edge impingement tube and the trailing edge impingement tube are sized to fit within the two cavities to produce impingement cooling of the inner airfoil walls opposed to the tubes.

6. The turbine stator vane of claim 1, and further comprising:
   an outer diameter endwall impingement plate secured to the outer diameter endwall and forming an outer endwall impingement cavity on the pressure side and the suction side of the endwall;
   impingement holes in the outer diameter endwall impingement plate; and,
   film cooling holes on the outer diameter endwall to direct film cooling air from the outer endwall impingement cavity into the hot gas flow.

7. The turbine stator vane of claim 6, and further comprising:
   an inner diameter endwall impingement plate secured to the inner diameter endwall and forming an inner endwall impingement cavity on the pressure side and the suction side of the endwall;
   impingement holes in the inner diameter endwall impingement plate; and, film cooling holes on the inner diameter endwall to direct film cooling air from the inner endwall impingement cavity into the hot gas flow.

8. The turbine stator vane of claim 2, and further comprising:
   the leading edge cavity impingement tube includes two stand-offs located near the outer endwall and the inner endwall to support the tube within the cavity.

9. A turbine stator vane for use in a gas turbine engine, the vane comprising:
   an inner diameter endwall and an outer diameter endwall;
   an airfoil extending between the inner and the outer diameter endwalls;
   a showerhead arrangement of film cooling holes on a leading edge region of the airfoil, the showerhead includes an upper section of film cooling holes directed downwards and a lower section of film cooling holes directed upwards;
   a row of exit cooling slots on the trailing edge region of the airfoil;
   a slanted rib slants toward the trailing edge from the outer endwall to the inner endwall, the slanted rib extending between the outer diameter endwall and the inner diameter endwall and separating a leading edge cavity within the airfoil from a trailing edge cavity;
   a leading edge impingement tube secured within the leading edge cavity;
   a trailing edge impingement tube secured within the trailing edge cavity;
   the row of exit cooling slots being connected directly to the trailing edge cavity; and, cooling air supply means to supply compressed cooling air to the leading edge cavity and the trailing edge cavity.

10. The turbine stator vane of claim 9, and further comprising:
the leading edge impingement tube projects out from the vane endwall at a distance X such that a vena contractor is fully reattached to the tube upstream of the impingement holes.

11. The turbine stator vane of claim 10, and further comprising:
the distance X is at least seven times the difference between the tube diameter and the minimum diameter of the vena contractor formed within the tube inlet.

12. The turbine stator vane of claim 10, and further comprising:
the trailing edge impingement tube projects out from the vane endwall at a long enough distance X such that a vena contractor forms within the tube inlet will end before the hot section of the airfoil begins.

13. The turbine stator vane of claim 9, and further comprising:
the impingement cooling holes on the impingement tube and the showerhead cooling holes on the leading edge are sized such that the pressure drop across the impingement holes is less than 30% of the total pressure drop across both the impingement and the showerhead cooling holes.

14. A turbine stator vane for use in a gas turbine engine, the vane comprising:
an inner diameter endwall and an outer diameter endwall;
an airfoil extending from the inner diameter endwall to the outer diameter endwall;
a leading edge cooling supply cavity with a showerhead arrangement of film cooling holes on a leading region of the airfoil;
a trailing edge cavity disposed within the airfoil and separating from the leading edge cavity;
an impingement tube sized to fit within the leading cavity, the impingement tube having impingement cooling holes to direct impingement cooling air to a leading edge region of the cavity; and,
the impingement tube includes an inlet projection out from an inner impingement plate that connected to the inner diameter endwall at a distance X such that a vena contractor is fully reattached to the tube upstream from the impingement holes.

15. The turbine stator vane of claim 14, and further comprising:
the distance X is at least seven times the difference between the tube diameter and the minimum diameter of the vena contractor formed within the tube inlet.

16. The turbine stator vane of claim 14, and further comprising:
the impingement tube narrows in the direction of the cooling air flow within the tube such that the cooling air pressure within the tube is substantially constant.

17. The turbine stator vane of claim 14, and further comprising:
the impingement cooling holes on the impingement tube and the showerhead cooling holes on the leading edge are sized such that the pressure drop across the impingement holes is less than 30% of the total pressure drop across both the impingement and the showerhead cooling holes.

* * * * *